2 Sheets—Sheet 1.
G. CURKENDALL.
SULKY-PLOW.
No. 183,254. Patented Oct. 17, 1876.
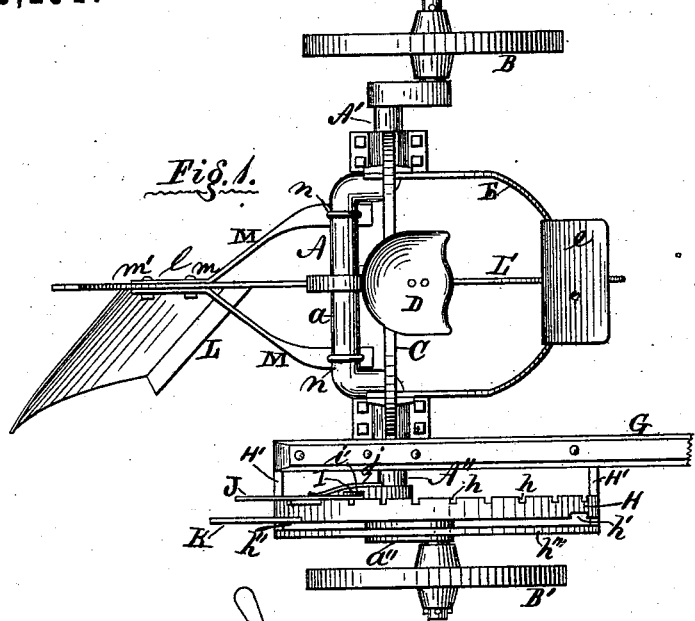
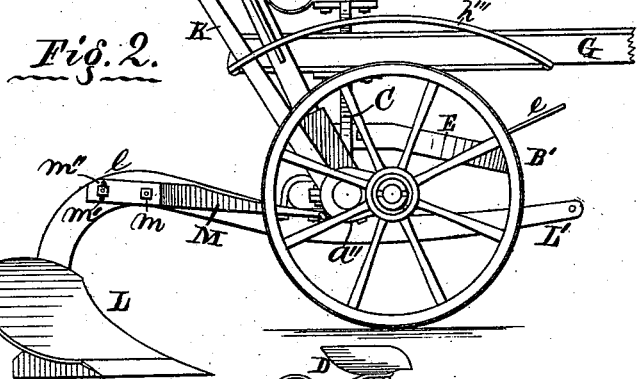
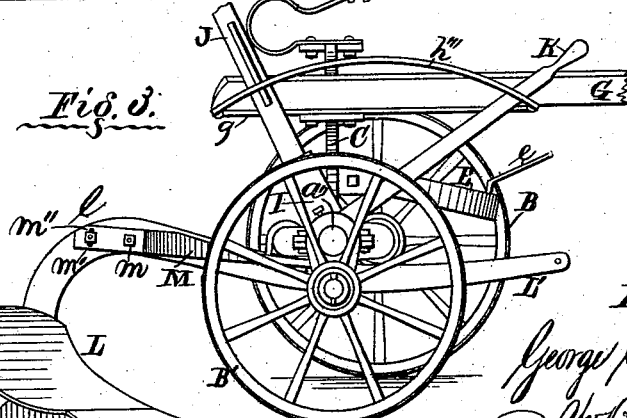
Witnesses:
D. A. Boal
M. H. Baninger
Inventor:
George Curkendall,
By W. B. Richards,
Atty.

2 Sheets—Sheet 2.
G. CURKENDALL.
SULKY-PLOW.
No. 183,254. Patented Oct. 17, 1876.
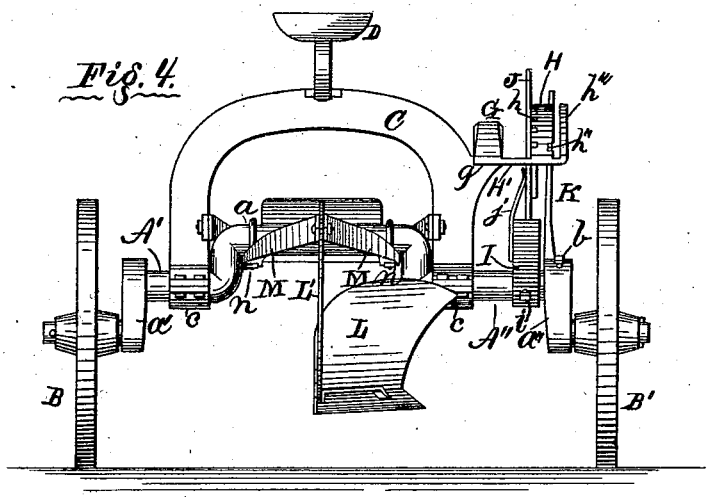
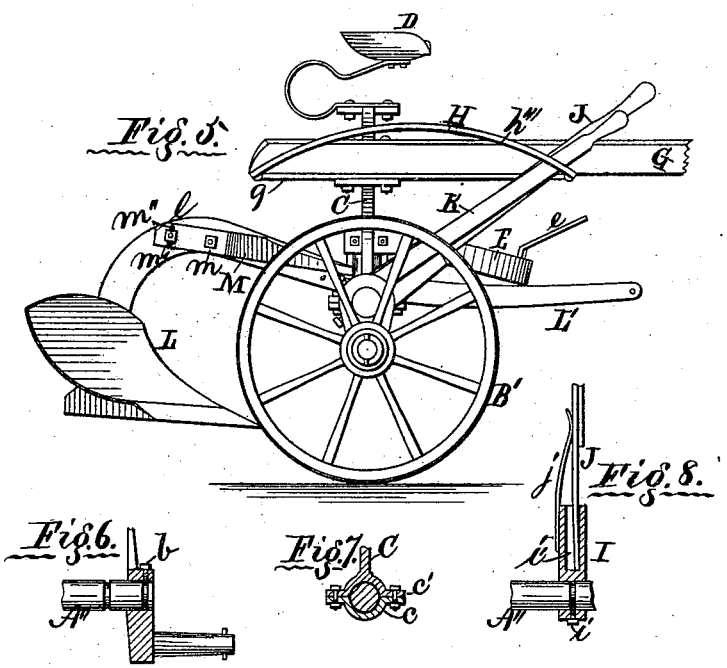
Witnesses:
M. H. Barringer.
D. a. Boal.
Inventor:
George Curkendall,
By W. B. Richards
atty.

UNITED STATES PATENT OFFICE.

GEORGE CURKENDALL, OF DAVENPORT, IOWA.

IMPROVEMENT IN SULKY-PLOWS.

Specification forming part of Letters Patent No. 183,254, dated October 17, 1876; application filed May 24, 1876.

*To all whom it may concern:*

Be it known that I, GEORGE CURKENDALL, of Davenport, in the county of Scott and State of Iowa, have invented certain new and useful Improvements in Sulky-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention relates to improvements in sulky-plows of that class in which a crank or bent axle supported on wheels is used to support the plow and other devices.

The first part of my invention relates to said crank-axle; and consists, first, in constructing it with a central crook or crank, to which the plow is attached, and cranks at each end, on which the supporting-wheels are journaled, with portions between the central and side cranks, on which the seat-arch is supported, for the purpose of adapting it to raising and lowering the plow considerably, and with but little raising and lowering of said arch. Second, in constructing it with a central crook or crank, to which the plow is attached, and a rigid crank at one end and adjustable crank at the other end, on which the supporting-wheels are journaled, adapting it to the following adjustments and purposes—viz., first, holding the wheels in the same horizontal plane while the central part of the crank-axle is lowered to bring the plow into working position, for opening first furrows and backing-furrows, and for finishing dead-furrows, &c.; second, holding the wheels in different horizontal planes, the one higher than the other, while the central part of the axle is lowered to bring the plow into working position for ordinary plowing; third, holding the wheels in the same horizontal plane while the central part of the axle is elevated to raise the plow clear of the ground, for turning at the ends of furrows, transportation on its own wheels, &c.

My invention further consists in the following combinations of trains of devices with the aforesaid axle, plow, and wheels, for more effectually commanding their operations: A hand-lever for adjusting and operating the central part and rigid end of the crank-axle; a hand-lever attached to the adjustable crank on the axle, for operation with aforesaid hand-lever in adjusting the different relative positions of the triple crank-axle; the combination of a single rack-bar with aforesaid hand-levers, and on which both may be adjusted.

My invention further consists in the use of intermediate pieces or braces for connecting the plow to the axle, to secure it from lateral flexure, and connecting said braces to the plow-beam by a pivotal bolt and a slot-and-bolt connection, through the instrumentality of which the plow may be "winged," or the angle of its bottom adjusted with relation to a transverse horizontal line.

My invention further consists in combinations herein described, and pointed out in the claims.

Figure 1 of the drawings is a top view of a sulky-plow embodying my invention, the parts in position for backing-furrows and opening dead-furrows. Fig. 2 is a side elevation of Fig. 1. Fig. 3 is a side elevation, showing the parts in position for ordinary plowing. Fig. 4 is a rear elevation, and Fig. 5 a side elevation, showing the plow elevated for turning. Fig. 6 is a sectional view, showing the attachment of the adjustable crank to the axle. Fig. 7 is a sectional view through the connection of the arch to the axle. Fig. 8 is a sectional view through the hand-lever, for operating the central and rigid cranks of the axle.

Referring to the parts by letters, letter A represents the axle, consisting of a bar, bent to form horizontal end parts A′ A″, and a central crank part, $a$, and provided with a fixed crank, $a'$, on the short part A′, and a crank, $a''$, on the long part A″, and adjustably secured thereto by a screw-bolt, $b$, which passes through the crank and rests in a groove in the end A″, as shown at Fig. 6, and which permits said crank to be rotated on the part A″. B B′ are the wheels, journaled on spindles on the cranks $a'$ $a''$. C is an arch, journaled on the parts A′ A″, as shown at Fig. 7, by means of boxing $c$, bolted to flanges $c'$ on the lower ends of the arch. The arch C carries the driver's seat D on its upper part, and a bow, E, projecting forward from its lower ends, and carrying a foot-rest, $e$. G is the guide-pole and arch-support, secured at its rear end to a bracket, g, projecting from the arch C. H is a segment-bar, supported on arms H', projecting from the tongue G, and has a series of notches, h, in one side, and a notch, h', at its forward end, and h'' at its rear end and in its other side, and also a guard-segment, h''', at its outer side. I is a short standard, adjustably secured on the arm A'' of the axle by a set-screw, i. (See Fig. 8.) The outer end of the arm 1 is formed into a socket, i', in which is seated the end of the spring-lever J, which is held to the series of notches h by a spring, j, as it is brought to coincide with them, and which allows the lever J to be sprung from the bar H to release it. The lever J may be fixed at different radial angles from the axle by means of the screw i, for the purpose of increasing the rotation of the axle in either direction without depressing the lever J out of reach of the driver. K is a spring-lever, attached rigidly to the crank a'', and flattened, so as to have a spring action, and allow it to be sprung outward to disengage it from the notches h' h''', in which it seats, for adjusting the crank a'' on the other parts of the axle. L is the plow, and L' the plow-beam. M M are braces attached to the beam L' at l, and, extending forward and diverging, are connected at their forward ends, one to each end of the part a of the axle by clips n, in which the axle a may rotate. The connection of the braces at l to the plow-beam is made by bolts m m'. The bolt m is a pivotal connection, and the bolt m' passes through a slot, m'', in each brace, so that the extreme rear ends of said braces may be adjusted, the one up and the other down, to "wing" the plow, or incline it laterally to either side, to adjust its running and cause it to clean and scour when depth of penetration is changed. The braces M hold the plow securely in line and prevent lateral deflection thereof.

The draft-animals are attached to the forward end of the plow-beam L'. The forward end of the guide-pole G is attached by an ordinary neck-yoke to the neck of the draft-animals, and sustains the arch C. The levers J and K are adjustable on the segment-bar H—the lever J for rotating and fixing the position of the cranks a a', and the lever K for rotating and fixing the position of the crank a''. With the levers J and K adjusted on the bar H, as shown at Fig. 1, the cranks a, a', and a'' will be radially in the same plane, bringing the wheels B B' on the same horizontal plane transversely across the machine, and the plow lowered for operation, as shown at Fig. 2 in opening back-furrows and other places where the wheels preferably run on the same plane, and the plow is required to run on a lower plane. The lever J remaining in the position last described, the lever K may be thrown forward, as shown at Fig. 3, and thus turn the crank a'' downward, and lower the wheel B' to the same horizontal plane as the plow, while the other wheel, B, retains its position in a higher plane, and thus adapts the implement to use in ordinary plowing, where the wheel B runs on the unplowed land, and the wheel B' in the previous furrow or cutting down into the plowed ground. The lever K remaining in the position last described, the lever J may be thrown forward, as shown at Figs. 4 and 5, and thus bring the cranks a a' a'' in the same radial plane from the parts A' A'' of the axle, thereby elevating the plow and lowering both wheels B B' to the same plane, so that the machine may be turned without either wheel slipping, and so that the plow may be carried on the wheels B B'. The plow is hung far enough back of the axle A to cause its forward end to rise first when the lever J is thrown forward. The lever J may be adjusted in the series of notches h, for regulating the depth of plowing while in either described position for operation.

What I claim as new, and desire to secure by Letters Patent, is—

1. The axle A, having a central crank, a, and side cranks a' a'', and horizontal parts A' A'', arranged to operate with one or more plows, L, attached to the central portion of the axle, and with arch C, substantially as described, and for the purpose specified.

2. The axle A, having central crank a and side crank a' rigidly connected thereto, and side crank a'' adjustably attached thereto, for operation with one or more plows, L, arch C, and wheels B B', substantially as described, and for the purpose specified.

3. The lever J, arranged to operate with the cranks a a', arch C, plow L, wheels B B', and crank a'', substantially as and for the purpose set forth.

4. The lever K and adjustable crank a'', combined with the axle A, having cranks a a', substantially as and for the purpose specified.

5. Levers J and K, attached respectively to the axles a, a', and a'', and arranged to both operate upon the same segment-bar H, as and for the purpose set forth.

6. The braces M, attached at their forward ends to the axle A, and at their rear ends to the beams L' by a pivotal bolt, m, and a bolt, m', through a slot, m'', substantially as and for the purpose specified.

7. The arch C and tongue G, combined with the triple crank-axle A, plow L, and wheels B B', substantially as and for the purpose specified.

8. The arch C and tongue G, combined with the triple crank-axle A, plow L, wheels B B', driver's seat D, levers J K, and segment H, substantially as and for the purpose specified.

In testimony that I claim the foregoing as my own I affix my signature in presence of two witnesses.

GEORGE CURKENDALL.

Witnesses:
HERMAN WITTENBERG,
ALBERT F. VINTON.